Sept. 14, 1965　　　D. H. BADGER　　　3,206,645
MOUNTING FOR ELECTRICAL ELEMENTS
Filed May 17, 1961　　　　　　　　　　　　2 Sheets-Sheet 1

INVENTOR.
DAVID H. BADGER
BY *Harry E Downer*
*Lindley Larson*
Attorneys

Sept. 14, 1965     D. H. BADGER     3,206,645
MOUNTING FOR ELECTRICAL ELEMENTS
Filed May 17, 1961     2 Sheets-Sheet 2

INVENTOR.
DAVID H. BADGER
BY
Attorneys

United States Patent Office 3,206,645
Patented Sept. 14, 1965

3,206,645
MOUNTING FOR ELECTRICAL ELEMENTS
David H. Badger, Indianapolis, Ind., assignor to Ransburg Electro-Coating Corp., a corporation of Indiana
Filed May 17, 1961, Ser. No. 110,846
10 Claims. (Cl. 317—99)

This invention relates to a mounting arrangement or assembly for electrical elements and more particularly to a mounting for a plurality of elongated elements which must be electrically interconnected and which operate at a relatively high voltage level.

The invention is particularly adapted for and is disclosed herein as embodied in a voltage multiplier power supply employing a plurality of serially interconnected rectifier units. A suitable circuit for such a power supply is shown in Bouwers Patent No. 2,213,199 issued September 3, 1940. In a power supply operating at relatively high voltages, the rectifiers used may be elongated stacks of small rectifier discs housed in a tube and forming a rectifier element. There must be a sufficient number of serially interconnected small rectifying cells to withstand the maximum peak inverse voltage of the supply (with a suitable safety factor), and in some types of voltage supplies, provision must be made for one or more connections to the rectifiers at intermediate points. In a high voltage supply, it is impractical to use a single stack of rectifier cells, and a plurality of elements must be mounted and connected together. In the past, the rectifier elements have been mounted on a supporting sheet of insulating material. Connections have generally been made by twisting and soldering together pigtail leads affixed to each rectifier element, or by mounting the rectifier sections in spring clips. Both arrangements have disadvantages. Soldering leads requires a great deal of assembly time; and the replacement of a defective rectifier element is rather difficult. Furthermore, the twisted and soldered leads generally have sharp end surfaces which lead to undesirable corona discharge in high voltage power supplies. While the spring clip mounting arrangement permits easy replacement of defective rectifier elements, the mounting of the clips on an insulating support during manufacture requires substantial time, and it is difficult to design compact physical structures using clip mounting to accommodate the assembly to limited spatial requirements. With both types of electrical connection, a high dielectric stress may be caused in the insulating material, with the soldered connection, by the small diameter of the leads and the sharp ends, and in the second arrangement, by the spring clips themselves.

A principal object of this invention is the provision of a novel mounting arrangement for elongated electrical elements in which the elements are readily replaceable, which requires no complicated assembly procedures and which is readily adaptable to a wide variety of physical configurations, to accommodate different spatial limitations.

One feature of the invention is the provision of mounting arrangement comprising a plurality of elongated electrical elements each having end portions with a conductive surface, and a pair of holders for the elements with the elements extending in a zigzag arrangement between the holders, the holders and elements having interengaging surfaces positioning the elements between the holders with the adjacent conductive surfaces of successive elements in contact serially interconnecting the elements. Another feature is that the holders are provided with sockets in which the adjacent element ends are received and held in contact, the sockets being spaced along the two holders.

A further feature is that the interval between sockets is such as to wedge the adjacent conductive portions of the end surfaces of successive elements together within the sockets effecting a good electrical contact, and that the holders are of a resilient material which is deformed by this wedging section to insure a tight electrical connection.

Still another feature is the provision of a high-voltage supply including tubular rectifier elements mounted in a zigzag arrangement in such holders, with the spacing between adjacent points of contact between the rectifier elements being greater than the minimum arcing distance for the potential differences between such points.

And another feature is the provision in a power supply having elements such as a transformer and capacitors of a series of rectifier elements carried by such holders and partially surrounding the other elements of the power supply to provide a compact power unit.

Further features and advantages of the invention will readily be apparent from the following specification and from the drawings in which.

Voltage multiplier, high voltage power supplies are used in many applications requiring relatively high voltages, as of the order of 100 kilovolts, but having a relatively low current drain. For example, such power supplies are commonly utilized in electrostatic painting equipment. The aforementioned patent to Bouwers illustrates such a supply.

In a representative power supply unit, a rectifier section may be made up of individual rectifiers, as selenium cells, stacked in an elongated tubular cartridge. Each cartridge element contains a plurality of cells, and has a peak inverse voltage capability dependent on the number of cells. In a specific example, an element four inches long has a voltage rating of 8,640 volts. Sixteen such elements may be used in a series in a 60 kilovolt supply employing a full wave voltage doubler so that the operating voltage per element is about 7,500 volts. The problems of physically mounting a large number of rectifier elements in a compact power supply have been described above.

Figure 1:
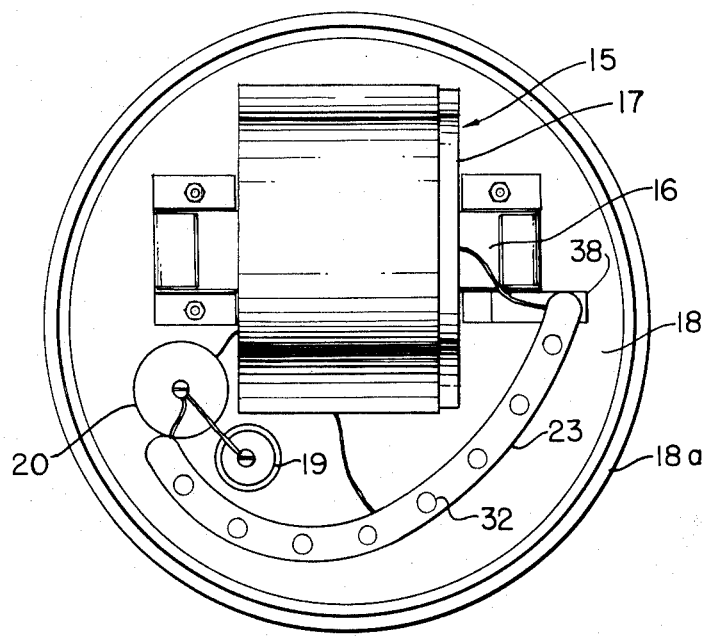
FIGURE 1 is a plan view of an embodiment of the invention.
Figure 2:
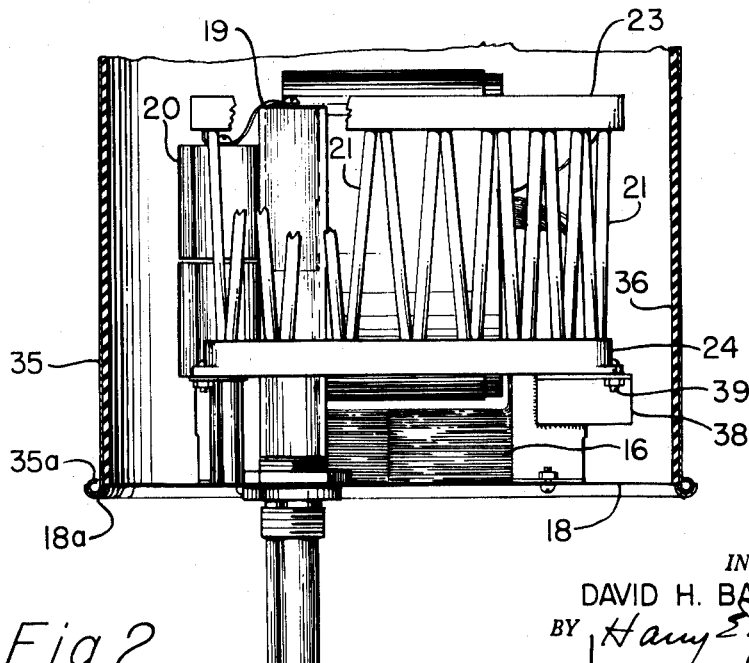
FIGURE 2 is an elevation of the embodiment of the invention of FIGURE 1.

Turning now to FIGURES 1 and 2 of the drawings, the invention is illustrated as embodied in such a high voltage power supply. The power supply includes a step-up transformer indicated generally as 15, having a core 16 with primary and secondary windings mounted thereon. The secondary winding 17 is preferably enclosed within an insulating covering. Transformer 15 is mounted on a plate 18 on which there are also mounted a conductor housing 19 and suitable high voltage capacitors 20.

The requisite number of rectifier elements 21 are mounted in a zigzag physical arrangement between elongated holders 23 and 24.

Figures 3, 4:
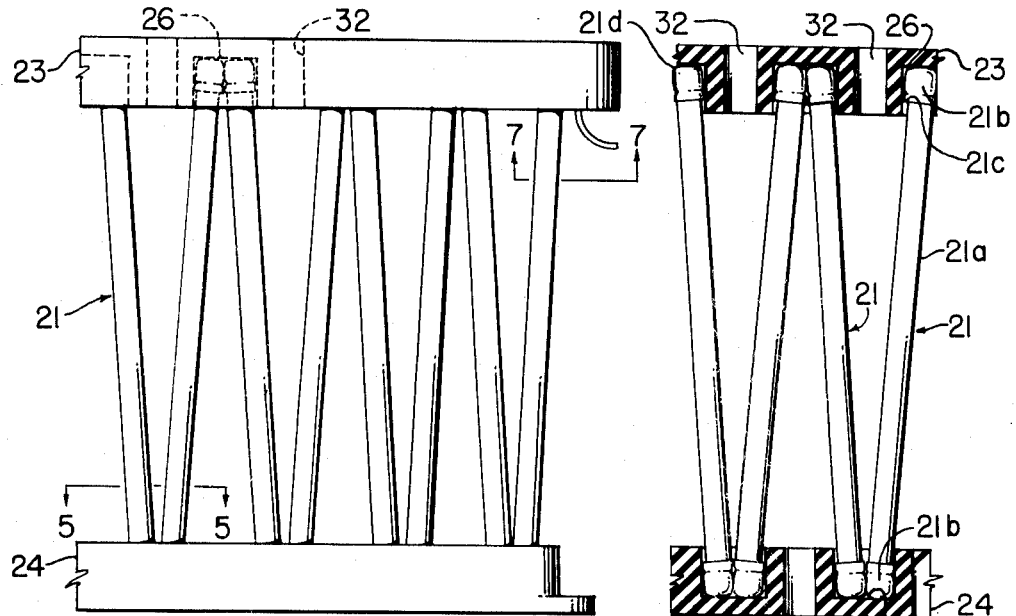
FIGURE 3 is a fragmentary illustration of a section of the electrical element mounting arrangement.
FIG. 4 is a view similar to FIGURE 3 with the holders in section.
Figure 5:
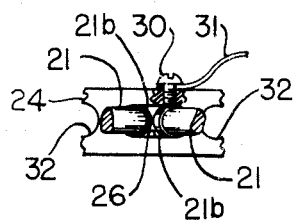
FIGURE 5 is a section taken generally along line 5—5 of FIGURE 3, with a portion of the holder broken away.

Referring more particularly to FIGURES 3, 4 and 5, the holders 23 and 24, which are of a suitable insulating material, are provided with a plurality of sockets 26 within which the ends of the rectifier elements are received and held in conductive relation. The holders are generally parallel and aligned and are shown with the sockets in one holder being staggered or having an offset relation with the sockets in the other. The rectifier elements 21 are serially connected and have a generally zigzag physical relation.

The specific rectifier element illustrated herein is sometimes referred to as a rectifier cartridge. It includes a tube 21a of a suitable insulating material, as a phenolic resin or glass, having a generally circular cross section and within which the rectifier cells or discs are stacked. The ends of the tube are provided with conductive ferrules 21b through which connection may be made to the rectifier discs. Each ferrule is larger in diameter than the tubular housing 21a and has an outwardly extending shoulder 21c adjacent the tube. The ends of the ferrules, as at 21d, are rounded and smooth reducing corona effect at high voltages.

The holders 23 and 24 are of a suitable insulating material, and should have at least a small degree of resilience. Polypropylene has been found particularly well suited for use in the high voltage power supply described herein, while polyethylene or nylon could be used in this and other applications. Other materials of suitable physical and electrical characteristics may be used depending on the requirements of the particular application. The sockets or cavities 26 may be formed in the elongated holder strips by a molding operation, or by suitably machining a solid member. The sockets preferably have a cross section with rounded ends and straight sides, providing a generally oval configuration, as best seen in FIGURE 5, and are dimensioned to provide positive contact between adjacent rectifier elements.

Several physical and electrical characteristics must be considered in the physical design of the assembly. With the total voltage of the power supply fixed, the number of rectifier elements may be selected; and this determines or establishes the length of each rectifier element (i.e. the number of cells in the element) and the voltage which will be developed between adjacent points of the zigzag rectifier stack. With the voltage between these points, and the dielectric characteristics of the holder material, its surface and of the insulating medium known, the spacing between sockets and their configuration are established, and this together with the length of the elements determines the angular relations between elements.

The sockets 26 preferably have a width and length such that there is an interference fit with the ferrules 21b of the rectifier elements when they are inserted. The length of the sockets is such that with the assembly completed and the elements tilted into the angular relation illustrated in the drawings, the conductive ferrules are wedged tightly together forming a good electrical contact, and the wedging action preferably occurs primarily between the ferrules and the end walls of the sockets so that the tube body 21a does not bear against the socket edge. The shoulder 21c of the ferrule is forced into the resliient holder material, locking the holders to the elements and completing the assembly.

It will be noted that the sockets 26 are sufficiently deep that the conductive ferrule surfaces are contained completely within them and are not directly exposed. This increases the surface arcing path between adjacent connection points or sockets of each holder and between the ferrules and surfaces at other potentials.

In a specific embodiment, the ferrules 21b are of circular cross section having a diameter of 0.25 inch. The sockets in the holders 23 and 24 for holding the cartridge elements 26 have a width of approximately 0.25 inch and a length of 0.5 inch and a depth of 0.375 inch. The holders are made of polypropylene and are ½ inch wide, ½ inch thick, and the distance between adjoining sockets in the holder is ½ inch. Holes ¼ inch in diameter are cut through the holder between adjacent sockets to limit the thickness of the holder in any one direction to approximately ⅛ inch.

Figure 7:
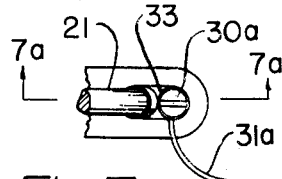
FIGURE 7 is a fragmentary plan view of the holder illustrating means for making an electrical connection to one of the electrical elements.

Electrical connections may be made to the conductive ferrules 21b of the end rectifier elements, and to the ferrules of intermediate elements in any suitable manner. One satisfactory arrangement is illustrated in FIGURE 5 where a screw 30 of conductive material extends through the wall of holder 24 and engages conductive ferrule 21b, the connecting lead 31 being secured to the lead of the screw 30. In FIGURE 7, there is shown an arrangement for making a connection to the rectifier element 21 in the socket 26 at one end of one of the holders where only one rectifier element is in the socket. In this arrangement a piece of copper tubing or a machined conductive slug 33, which is substantially the same size as the conductive ferrule 21b, is inserted into socket 26 to take the place of the end of the rectifier element. A connecting lead 31a is secured to the connecting slug 33 by screw 30a.

It has been found that when molding holders of certain amterials, as polypropylene, it is difficult to achieve a solid web of material between adjacent sockets. It is undesirable to have a void in the plastic material between connections at high potentials, as the high voltage gradient through the materials tends to cause ionization of a trapped gas, as air, and may result in a gradual breakdown of the material of the holders between the adjacent sockets. The molding problem is simplified where the mold is cored to form openings or holes 32 between adjacent sockets 26. This eliminates the thick section of plastic material and the resulting tendency of getting trapped air which would reduce the dielectric strength and life of this insulating material, and increases the surface path between adjacent sockets, further improving the voltage breakdown characteristics of the holder. Where the assembly is immersed in a dielectric oil bath during use, oil fills the holes 32, adding to the insulation strength of the apparatus.

The holder assembly illustrated in FIGURES 1 and 2 has a generally arcuate configuration, when viewed from above, partially surrounding the other elements of the power supply. The holders may be formed in any desired configuration to accommodate the mounting assembly to the spatial requirements of the environment in which it is used. The holders may suitably be molded in the desired configuration; or they may be provided in straight lengths of a dielectric material which may be bent to the desired configuration. For example, a polyethylene strip may be bent to the desired shape, raised to a suitable temperature to cause it to take a set, without melting, providing the desired holder configuration.

In FIGURES 1 and 2, the base plate 18 on which the various elements are mounted is circular in configuration and may form the closure or cover for a container of dielectric oil in which the apparatus is immersed during operation. As shown in FIGURE 2, the lip 35a of container 35 is received in an annular channel 18a around the outer periphery of closure 18. The rectifier assembly is spaced inwardly from the container wall and between the container and the remainder of the power supply elements. The inner wall of container 35 is preferably lined with an insulating sheet 36, as of polyethylene, to reduce the possibility of arcing between elements of the power supply and the container.

In the embodiment of the invention illustrated in FIGURE 1, a mounting bracket 38 for the holders 23 and 24 is carried by the core 16 of transformer 15. One end of each holder is secured to the bracket, as by bolts 39. The opposite ends of the holders are left free but are held together by the wedging action of the rectifier elements 21 which are tightly secured within the sockets 26 and prevent the holders from separating. Of course, in an application where additional support is desirable, it may be provided.

Figure 6:
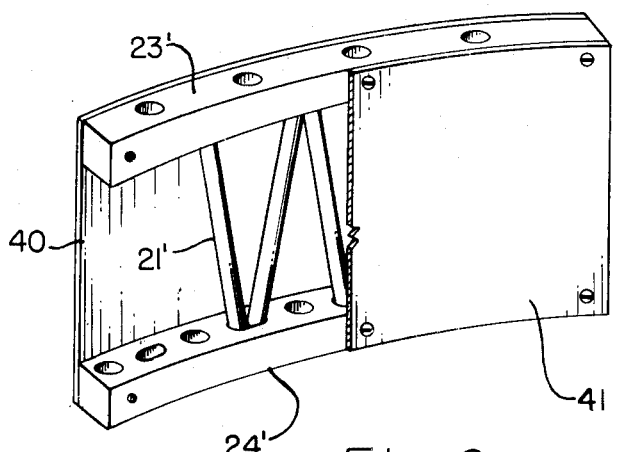
FIGURE 6 is a perspective view of a modified form of the invention.
Figure 7A:
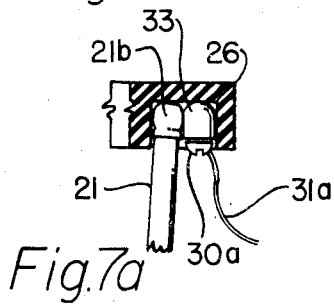
FIGURE 7A is a section taken generally along line 7A—7A of FIGURE 7.

A further embodiment of the invention is illustrated in FIGURE 6 where the holders 23′ and 24′ have secured thereto side plates 40 and 41, which may be of a suitable insulating material, as polypropylene or polyethylene. The sheets 40 and 41 are preferably coextensive with the holders 23′ and 24′ and provide an enclosure for the electrical elements 21′ in addition to interconnecting the holders.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A mounting for electrical elements of the character described, comprising: a plurality of elongated electrical elements each having end portions with a conductive surface; and a pair of generally parallel, aligned holders of insulating material for said elements, said elements extending in a zigzag arrangement between said holders, said holders having a plurality of spaced socket portions in which a pair of end portions of adjacent elements are received positioning the elements between the holders, conductive surfaces of the adjacent end portions of successive elements being held in contact, interconnecting the elements, and the spaced socket portions of one of said holders being staggered with respect to the spaced socket portions of the other holder.

2. A mounting for electrical elements of the character described, comprising: a plurality of elongated electrical elements each having end portions with a conductive surface; and a pair of holders of insulating material for said elements, said holders having a plurality of spaced sockets formed therein, the spacing between corresponding sockets in said holders being substantially the same, the elements extending in a zigzag arrangement between the holders, with the adjacent end portions of successive elements received in one of said sockets, and the conductive surfaces of adjacent end portions of successive elements being electrically connected, serially interconnecting the elements.

3. A mounting for electrical elements of the character described, comprising: a plurality of elongated electrical elements each having end portions with a conductive surface; and a pair of generally parallel, aligned holders of insulating material for said elements, each of said holders having spaced sockets, with the sockets in one holder staggered with respect to the sockets of the other, said elements extending in a zigzag arrangement between said holders with the adjacent end portions of successive elements received in said sockets and wedged together by virtue of the staggered socket and zigzag element relations, the conductive surfaces of adjacent end portions of successive elements being held in electrical contact, interconnecting the elements.

4. A mounting for electrical elements of the character described, comprising: a plurality of elongated electrical elements each having end portions with a conductive surface; and a pair of holders for said elements, said holders being of resilient insulating material, each holder having a plurality of spaced sockets formed therein, the spacing between corresponding sockets in said holders being substantially the same, the elements extending in a zigzag arrangement between the holders, with the adjacent end portions of successive elements received in one of said sockets and held in wedged relation by the resilience of the holder material, the conductive surfaces of adjacent end portions of successive elements being electrically connected, serially interconnecting the elements.

5. A mounting for electrical elements of the character described, comprising: a plurality of elongated electrical elements each having enlarged ferrule end portions with a conductive surface; and a pair of generally parallel, aligned holders for said elements, said holder being of insulating material and each of said holders having spaced oval sockets, with the sockets in one holder staggered with respect to the sockets of the other, said elements extending in a zigzag arrangement between said holders with the adjacent end portions of successive elements received in said sockets the ferrules bearing on the socket wall and wedged together by virtue of the staggered socket relation, the conductive surfaces of adjacent ferrule end portions of successive elements being held in electrical contact, serially interconnecting the elements.

6. The electrical element mounting of claim 2 wherein the spacing between adjacent points of contact of conductive element surfaces is greater than the arcing distance for the potential therebetween.

7. The electrical element mounting of claim 2 wherein an insulating plate joins said holders and secures them together.

8. A mounting for electrical elements of the character described, comprising: a plurality of elongated electrical elements each having end portions with a conductive surface; and a pair of holders of insulating material for said elements, said holders having a plurality of spaced sockets formed therein, the spacing between corresponding sockets in said holders being substantially the same, the elements extending in a zigzag arrangement between the holders, with the adjacent end portions of successive elements received in one of said sockets, and the conductive surfaces of adjacent elements electrically connected, serially interconnecting the elements, said holders having holes therein between adjacent sockets.

9. In a high voltage power supply having a transformer and filter elements, a rectifier mounting assembly of the character described, comprising: a plurality of elongated rectifier elements, each having end portions with a conductive surface; and a pair of elongated holders of insulating material for said elements, the elements extending in a zigzag arrangement between said holders, said holders having a plurality of spaced socket portions in which a pair of end portions of adjacent elements are received positioning the elements between the holders with the conductive surfaces of the adjacent end portions of successive elements in contact, serially connecting the elements, corresponding socket portions in said holders being substantially equally spaced, said holders having an arcuate configuration extending partially around said transformer and filter, with the rectifier elements being adjacent to and partially surrounding said transformer.

10. In a high voltage power supply having a transformer and filter elements, a rectifier mounting assembly of the character described, comprising: a plurality of elongated rectifier elements, each having end portions with a conductive surface, a pair of elongated holders of insulating material for said elements, the elements extending in a zigzag arrangement between said holders, said holders having a plurality of spaced socket portions in which a pair of end portions of adjacent elements are received positioning the elements between the holders with the conductive surfaces of the adjacent end portion of successive elements in contact, serially connecting the elements, corresponding socket portions in said holders being substantially equally spaced said holders having an arcuate configuration extending partially around said transformer and filter, with the rectifier elements being adjacent to and partially surrounding said transformer; a dielectric oil-filled container; and a base member on which said transformer and holders are mounted, serving as a closure for said container, said holders having a generally arcuate configuration partially surrounding said transformer and fitting within said container.

References Cited by the Examiner

UNITED STATES PATENTS

| | | | |
|---|---|---|---|
| 1,842,716 | 1/32 | De Ferranti | 317—234 |
| 2,213,199 | 9/40 | Bouwers et al. | 321—15 |
| 2,243,941 | 6/41 | Bouwers | 321—15 |
| 2,549,995 | 4/51 | Van Dorsten | 321—15 |
| 2,985,812 | 5/61 | Peterson | 317—99 X |

FOREIGN PATENTS 860,473  2/61  Great Britain.

JOHN F. BURNS, *Primary Examiner.*